Dec. 29, 1931. H. M. JACOBS ET AL 1,838,182

SCALE

Filed Nov. 28, 1927   2 Sheets-Sheet 1

INVENTORS
Harry M. Jacobs and Aaron J. Jacobs
BY
ATTORNEYS.

Dec. 29, 1931.  H. M. JACOBS ET AL  1,838,182
SCALE
Filed Nov. 28, 1927   2 Sheets-Sheet 2
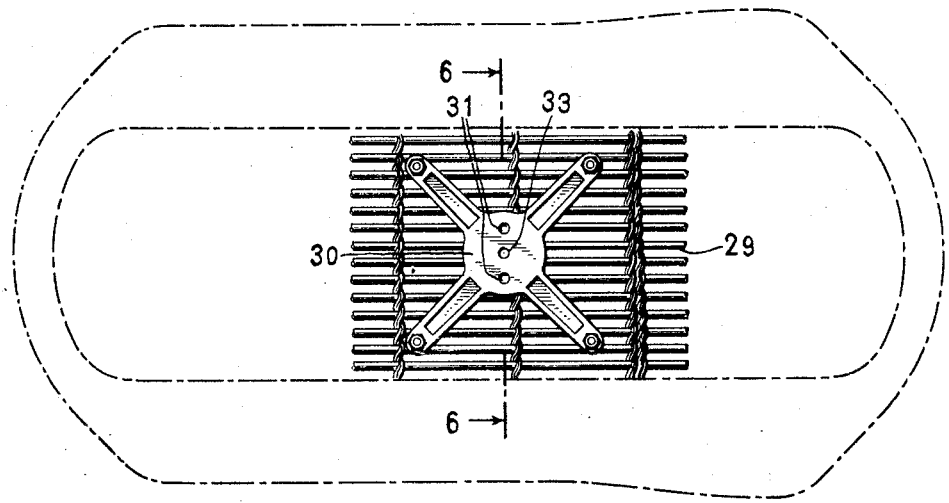
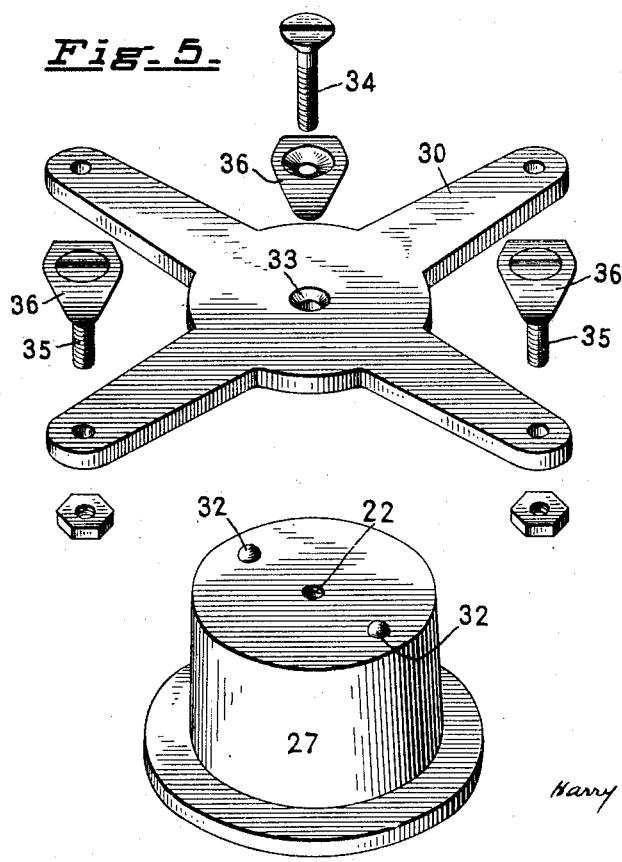
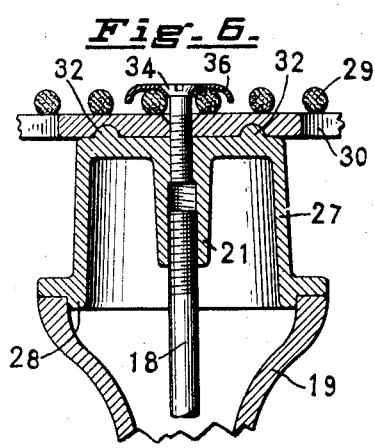
INVENTORS
Harry M. Jacobs and Aaron J. Jacobs
BY
ATTORNEYS.

Patented Dec. 29, 1931

1,838,182

UNITED STATES PATENT OFFICE

HARRY M. JACOBS AND AARON J. JACOBS, OF BROOKLYN, NEW YORK, ASSIGNORS TO JACOBS BROTHERS SCALE CO., OF NEW YORK, N. Y., A CORPORATION OF NEW YORK

SCALE

Application filed November 28, 1927. Serial No. 236,059.

This invention relates to a scale and specifically aims to provide an improved pan mounting structure.

It is an object of the invention to furnish such a device in which the parts may be disassembled and assembled readily and in which, during such assembly, there will be no danger of parts being damaged incident to the pan being applied improperly to its mounting structure.

A further object of the invention is that of furnishing a scale and particularly a mounting, in which the parts will be relatively few in number and individually simple and rugged in construction, these parts being readily assembled to provide a device operating over long periods of time with freedom from mechanical difficulty.

With these and further objects in mind reference is had to the attached sheet of drawings illustrating different forms of the present invention and in which:

Fig. 4 is a bottom plan view of a basket-pan construction.

Fig. 5 is a perspective view of the support utilized in connection therewith, and Fig. 6 is a transverse sectional view taken along the lines 6—6 in the direction of the arrows of Fig. 4.

Figure 1:
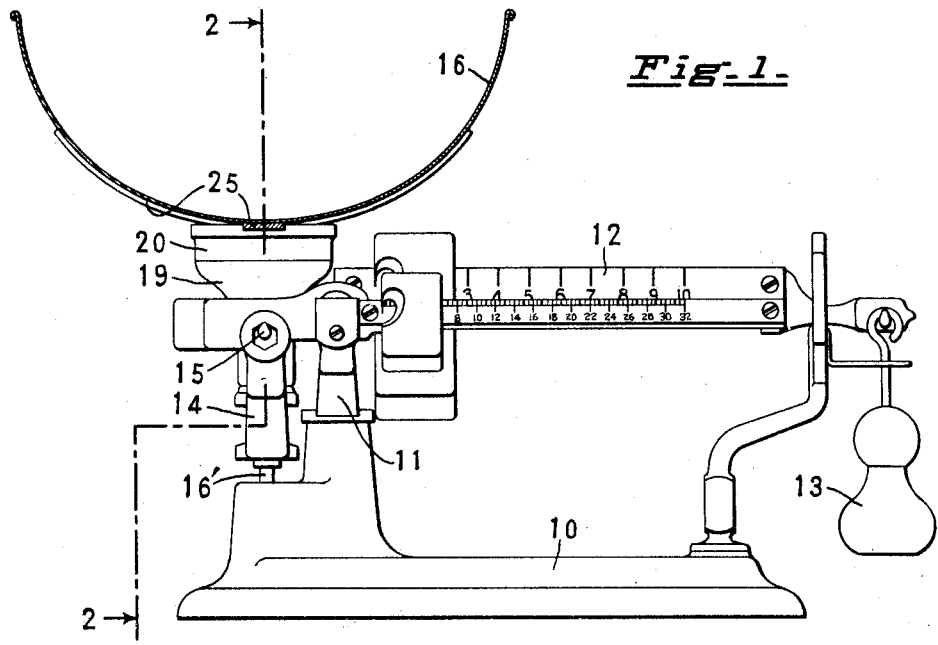
Figure 1 is a front view of a scale structure embodying the present invention and showing the pan or platform in section.
Figure 2:
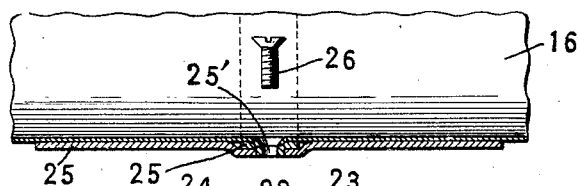
Fig. 2 is a fragmentary enlarged sectional view taken along the lines 2—2 in the direction of the arrows of Fig. 1.
Figure 3:
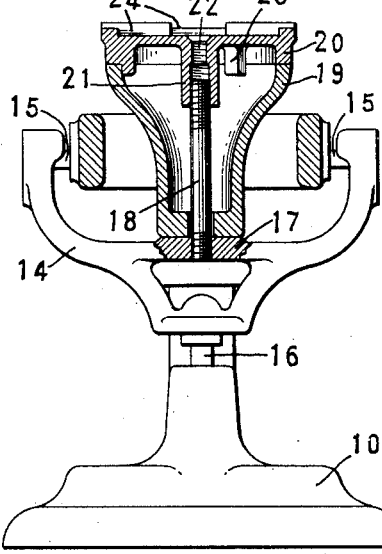
Fig. 3 is a plan view of the cap upon which the pan or platform rests.
Figure 3:
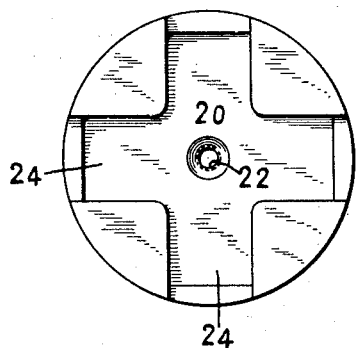

Referring primarily to Figures 1 to 3, the numeral 10 indicates a scale base from which a yoke 11 extends upwardly, this yoke supporting, by means of pivot-bearings (not shown) a beam 12. A counter-poise 13 may be suitably attached to the outer end of the beam and the inner arm thereof may be connected, as by a yoke 14, bearings 15 and stem 16' to a guiding structure and dash-pot (not shown).

The platform or pan 16 is supported by the beam and may be formed of sheet metal and have any desired configuration. With a view to operatively attaching this member to the scale beam, the yoke 14 provides a supporting surface 17 which may be centrally bored and screw-threaded. Extending into this opening is the end of a screw-threaded stem 18, the body of which is enclosed by a bell-shaped supporting member 19 which mounts, at its upper end, a cap 20 having a central, downwardly extending boss 21, the body of which is threaded for engagement with the threads at the upper end of the rod 18, and which bore is preferably reduced, as at 22, adjacent its upper end. The inner edge of the cap has downwardly depending lugs 23 which engage the inner face of the bell-shaped housing 19 so that, as a consequence, when the parts are tightened by the turning of the rod with respect to the supporting portion 17 and the cap with respect to the rod, these parts will be held against relative movement and move as a unit with the yoke 14.

The upper face of the cap is, in the present exemplification, formed with a pair of grooves 24 extending at right angles with respect to each other and the center lines of which are intersected by the bore 22. The under face of the pan 16 bears against straps or arms 25, the bodies of which cross each other, as in Figure 2, these straps or arms having, in the present instance, their outer ends secured as, for example, by welding, to the pan 16. At the point of intersection of these straps they, together with the pan body, are formed with aligned openings 25', it being here observed that the upper strap, as well as the pan structure, may be struck inwardly at this point in order to provide an interlocking construction. After the straps are positioned to rest within grooves 24 a screw 26 has its stem passed through these openings and into the bore 22, it being obvious that with this screw tightened no play will come into being between the several parts.

In the form shown in Figures 4 and 6 the bell-like housing 19, instead of mounting a cap of the exact construction shown in the preceding figures, mounts a cap 27, the body of which is relatively higher. In this instance it is obvious that the rod 18 is of greater length in order to engage the bore of the centrally extending boss 21 and in lieu of the lugs 23 an annular flange 28 may be employed to prevent sidewise shifting. As shown, a pan or platform in the nature of a basket 29 is, in the present instance, mounted by the beam end and rigid attachment of the parts is assured by utilizing a cross-member 30, the lower face of which may be formed with a pair of indentations 31 into which projections 32 formed in the upper face of the cap extend to prevent shifting. The cross-member 30 is, similarly to the structure of the preceding figures, formed with an opening 33 through which the stem of a screw 34 may pass into engagement with the threads formed in the reduced upper bore portion of the boss 21. In order to secure the basket to this cross-member, each of the arms thereof may be formed with a screw-threaded opening for engagement with the shank of a screw 35 which passes through an anchoring element 36 providing a pair of arms. Likewise, the screw 34 may pass through a similar anchoring element and, as shown in Figure 6, each of these anchoring elements straddles a pair of horizontal bars or rods of the basket so that, when the parts are tightened the desired result will be achieved.

It will be apparent that by means of the present invention a rigid structure is provided, but that the parts thereof may readily be detached when desired. Furthermore, there will be no danger of stripping the threads of these parts during assembly and thus, among others, the several objects specifically aforementioned are accomplished, it being understood that numerous changes in construction and re-arrangement of the parts might be resorted to without departing from the spirit of the invention as defined by the claims.

Having described our invention what we claim as new and desire to secure by Letters Patent is:

1. As an article of manufacture a scale pan including a body and a strip of material immovably secured to such body, such body and strip being formed with aligned openings and a portion of one of such elements being keyed into the opening of the other of the same.

2. As an article of manufacture a pan for scales comprising a body, a pair of strips extending at angles to and crossing each other, such strips being secured to said pan body and at their point of intersection being formed with an opening, the pan body being also formed with an opening in line with such strip openings and a portion of the material of said pan extending into the openings in the strips.

3. A scale including, in combination, a beam, a support associated therewith, a cap, means preventing movement of said cap in any direction with respect to said support, a pan, means for securing said pan against movement towards and away from said cap and means for preventing relative rotation of said cap and pan.

4. A scale including, in combination, a movable beam, a support associated therewith, a cap secured to said support against movement in any direction with respect thereto, a pan, means for securing said cap to said pan to prevent movement of such elements towards and away from each other, one of said elements being formed with a recess and a projection forming a part of another of said elements and extending into such recess to prevent relative rotation of such elements.

5. A scale including a rockingly mounted beam, a supporting member associated therewith, a housing positioned upon said support, a cap carried by said housing, means extending between such cap and said support to secure the housing to the latter, a pan and means for securing said pan to said cap.

6. A scale including a beam, a support associated therewith, a rod secured to said support, a cap attached to said rod, a housing interposed between said cap and support, a pan resting upon said cap and means for securing said pan to said cap.

7. A scale including, in combination, a beam, a support associated therewith, a cap immovably attached to said support, a pan and means extending through an opening in said pan and into a screw-threaded bore in said cap for securing the former in position upon the latter.

8. A scale including, in combination, a beam, a support associated therewith, a cap immovably attached to said support, a pan comprising a pair of spaced members, a bridging element extending therebetween and a fastening member secured to said bridging element and attached to said cap to retain said pan thereon.

In testimony whereof we affix our signatures.

HARRY M. JACOBS.
AARON J. JACOBS.